UNITED STATES PATENT OFFICE.

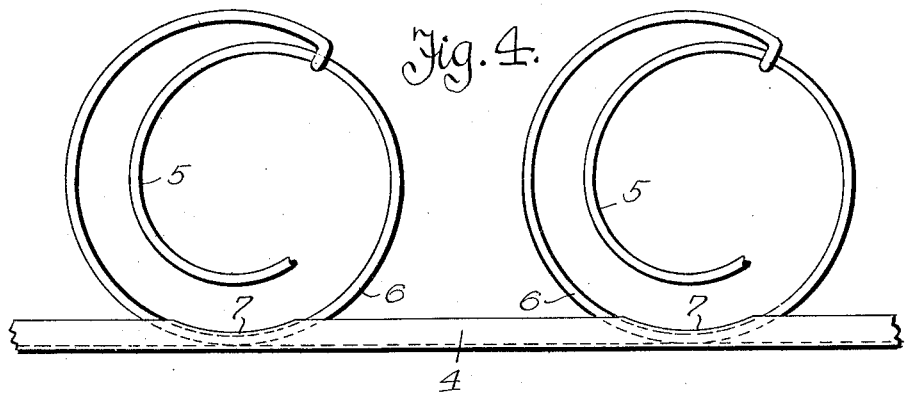
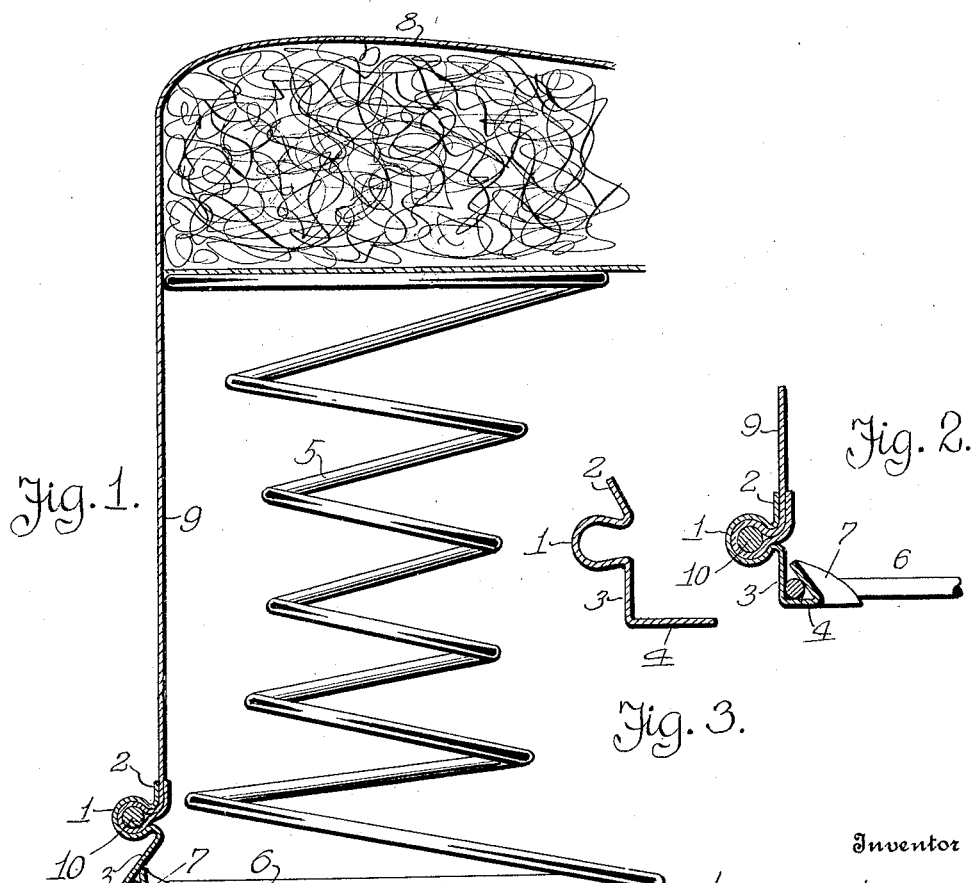

WILLIAM D. McCULLOUGH AND THOMAS MAHONEY, OF DETROIT, MICHIGAN, ASSIGNORS TO PREMIER CUSHION SPRING COMPANY, OF DETROIT, MICHIGAN, A CORPORATION OF MICHIGAN.

UPHOLSTERY-SPRING CONSTRUCTION.

1,387,160.  Specification of Letters Patent.  Patented Aug. 9, 1921.

Application filed December 27, 1918. Serial No. 268,530.

*To all whom it may concern:*

Be it known that we, WILLIAM D. MC-CULLOUGH and THOMAS MAHONEY, citizens of the United States of America, residing at Detroit, in the county of Wayne and State of Michigan, have invented certain new and useful Improvements in Upholstery-Spring Construction, of which the following is a specification, reference being had therein to the accompanying drawings.

This invention relates to upholstery spring construction and to an arrangement thereof whereby the springs may be readily mounted in position and the upholstery covering applied and secured. One of the objects and features of the construction is the disposition and construction of the frame which permits the ready attachment of the lower margin of the upholstery covering as well as the insertion and retention of the springs around the border of the frame.

The invention consists in the matters hereinafter set forth, and more particularly pointed out in the appended claims.

In the drawings,

Figure 1 is a view in vertical section of a portion of a spring structure embodying features of the invention;

Fig. 2 is a view in detail of a modification of a rim strip for one of the frames of the structure;

Fig. 3 is a similar view showing the strip before the insertion of a spring and upholstery covering, and Fig. 4 is a plan view of the bottom of a portion of the frame detailing the method of the spring attachment.

Referring to the drawings a rim strip, preferably of sheet metal, is formed with a retaining groove on its inner side, the metal being struck out longitudinally of the strip in a hollow bead 1 just below the upper marginal portion 2 thereof. A web portion 3 of the strip extends from the bead 1 and acts as a support for a ledge 4 which extends from the side of the strip opposite the bead 1. The body of the construction is formed of upright springs 5 of the usual spiral type with the base coil 6 of each placed on the ledge 4 and secured thereon by pinching in the ledge part that lies inside the arc of the base coil as indicated at 7. As shown in Fig. 1 the web portion 3 may incline slightly from the plane of the flange 2, or it may lie in plane or parallel to the plane thereof as indicated in Figs. 2 and 3.

The applied upholstery, which is laid on the top of the springs, has the usual cover 8 with a depending apron 9, the welted edge 10 of which is inserted in the groove formed by the hollow bead 1. As a good detail of construction the mouth of the groove is wide enough to permit this insertion, as indicated in Fig. 3. Afterward by the proper tool the rib is pinched together so as to tightly grip the welt or corded edge.

One result of the construction is the facility with which the upholstery may be placed in position. That is, if the strip is part of a base frame, the springs may be inserted and clenched in position by a pair of pliers or the like from the outside of the frame. Thereafter the upholstery may be applied, the springs sufficiently compressed to permit the insertion of the welt, and then the hollow bead may be gripped down upon the welt again from the outside of the construction without the necessity of the inversion of the seat as is usual in ordinary upholstery processes. When completed the strip furnishes a complete finish around the base frame and the apron of the upholstery is protected from any wear as it is only subject to tension against the rounded portion of the strip which terminates in the upper flange.

As will be seen, this arrangement places the entrance to the groove and the ledge to receive the spring on the same side of the strip, the strip thus concealing the marginal edge of the apron or curtain and also concealing the portion of the spring below the curtain, the curtain being exposed only above the upper marginal edge of the strip; and since this edge is spaced from the groove itself, there is provided an exposed strip portion extending parallel to the face of the curtain and against which the latter contacts, the strip portion thus forming a projecting structure to protect a portion of the curtain immediately above the portion which is secured within the groove, this protection being afforded, without, however, affecting the ability of the curtain's free movement in use. This particular arrangement also carries the additional advantage, in that the entrance wall of the groove over which the curtain is led, is free from all raw edge conditions, thus reducing liability of damaging the curtain under any pulling strains that might be provided in use. In addition, this arrangement permits of the anchoring of the curtain solely by the walls of the groove itself, the curtain thus being located entirely above the point where the spring turn is supported, so that there is no liability of damage from this source, while at the same time, the marginal edge portion of the curtain can be actually anchored by the strip, instead of requiring the presence of a reinforcing cord structure which must itself serve to retain the marginal edge. Another advantage of the particular arrangement shown, is the fact, that as shown by a cross section of the strip, the location of the entrance to the groove at a point spaced from both edges of the strip and also spaced from the ledge, provides an intermediate strip portion which is exposed and thus produces a strip length below the bead formed by the groove and which provides a wall to strengthen the structure; and this particular arrangement, by reason of the character of the bends which provides the ledge and the entrance to the groove, permits of strip manipulation by a pinching or clenching action to close the groove and, if necessary, to tend to draw the curtain more taut, without affecting the strength of the strip portion excepting possibly to change its angularity relative to the ledge plane and yet retain the strength provided by a strip portion of this type.

Obivously, changes in the details of construction may be made without departing from the spirit of our invention and we do not care to limit ourselves to any particular form or arrangement of parts.

What we claim is:—

1. In upholstery spring construction wherein the upholstery is supported by spiral springs and the upholstery covering includes a marginal portion positioned to curtain the spring formation, a rim strip having a cross-sectional configuration to receive and secure the marginal edge of the curtain and support a spring turn, the strip configuration locating the secured edge and spring turn on the same side of the strip with the marginal edge of the curtain leading into the rim strip in a direction substantially transverse to the plane of the exposed curtain portion.

2. In upholstery spring construction wherein the upholstery is supported by spiral springs and the upholstery covering includes a marginal portion positioned to curtain the spring formation, a rim strip having a cross-sectional configuration to receive and secure the marginal edge of the curtain and support a spring turn, the strip including an inwardly opening groove to receive and secure the marginal edge of the curtain, with the entrance of the groove positioned to cause the margin of the curtain to enter the groove in a direction substantially transverse to the exposed portion of the curtain.

3. In upholstery spring construction wherein the upholstery is supported by spiral springs and the upholstery covering includes a marginal portion positioned to curtain the spring formation, a rim strip having a cross-sectional configuration to receive and secure the marginal edge of the curtain and support a spring turn, the strip including an inwardly opening groove to receive the marginal edge of the curtain, the entrance of the groove being positioned to cause the margin of the curtain to enter the groove in a direction substantially transverse to the plane of the exposed portion of the curtain, the groove wall being compressible in a direction to produce a ledge at the entrance to the groove and over which the margin of the curtain is led to anchor the inserted edge in position.

4. In upholstery spring construction wherein the upholstery is supported by spiral springs and the upholstery covering includes a marginal portion positioned to curtain the spring formation, a rim strip having a cross-sectional configuration to receive and secure the marginal edge of the curtain and support a spring turn, the strip including an inwardly-opening groove to receive the curtain marginal edge and an inwardly extending ledge to form a support for a turn of the spring, the entrance of the groove being positioned to cause the margin of the curtain to enter the groove in a direction substantially transverse to the plane of the exposed portion of the curtain.

5. In upholstery spring construction wherein the upholstery is supported by spiral springs and the upholstery covering includes a marginal portion positioned to curtain the spring formation, a rim strip having a cross-sectional configuration to receive and secure the marginal edge of the curtain and support a spring turn, the strip including an inwardly-opening groove to receive the curtain marginal edge and an inwardly extending ledge to form a support for a turn of the spring, the entrance of the groove being positioned to cause the margin of the curtain to enter the groove in a direction substantially transverse to the plane of the exposed portion of the curtain, said groove and ledge being spaced apart in the cross-sectional length of the strip to produce an exposed strip face below the groove wall.

6. In upholstery spring construction wherein the upholstery is supported by spiral springs and the upholstery covering includes a marginal portion positioned to curtain the spring formation, a rim strip having a cross-sectional configuration to receive and secure the marginal edge of the curtain and support a spring turn, the strip including an inwardly opening groove to receive and secure the marginal edge of the curtain, the groove wall being spaced from the strip edges to produce an exposed strip portion overlying the curtain face above the groove, the groove wall having a formation to produce a bead-like portion projecting outwardly from the plane of the exposed strip portion.

7. In upholstery spring construction wherein the upholstery is supported by spiral springs and the upholstery covering includes a marginal portion positioned to curtain the spring formation, a rim strip having a cross-sectional configuration to receive and secure the marginal edge of the curtain and support a spring turn, the strip including an inwardly opening groove to receive and secure the marginal edge of the curtain, the groove wall being spaced from the strip edges to produce a groove entrance wall free from raw edge conditions.

8. In upholstery spring construction wherein the upholstery is supported by spiral springs and the upholstery covering includes a marginal portion positioned to curtain the spring formation, a rim strip having a cross-sectional configuration to receive and secure the marginal edge of the curtain and support a spring turn, a cross-section of the strip including a groove having an entrance wall free from raw edge conditions.

9. In upholstery spring construction wherein the upholstery is supported by spiral springs and the upholstery covering includes a marginal portion positioned to curtain the spring formation, a rim strip having a cross-sectional configuration to receive and secure the marginal edge of the curtain and support a spring turn, a cross-section of the strip including a groove having an open entrance spaced from the strip edges to produce an entrance wall free from raw edge conditions, a strip portion intermediate the groove entrance and a strip edge extending in parallelism with the secured curtain.

10. In upholstery spring construction wherein the upholstery is supported by spiral springs and the upholstery covering includes a marginal portion positioned to curtain the spring formation, a rim strip having a cross-sectional configuration to receive and secure the marginal edge of the curtain and support a spring turn, a cross-section of the strip including a groove having an open entrance to receive the curtain marginal edge and a ledge to support a spring turn, said entrance and ledge being spaced apart to form an exposed face, the groove wall having a formation to produce a bead-like portion projecting outwardly from the plane of the exposed strip portion.

11. In upholstery spring construction wherein the upholstery is supported by spiral springs and the upholstery covering includes a marginal portion positioned to curtain the spring formation, a rim strip having a cross-sectional configuration to receive and secure the marginal edge of the curtain and support a spring turn, a cross-section of the strip including a groove having an open entrance to receive the curtain marginal edge and a ledge to support a spring turn, said entrance and ledge being spaced apart to form an exposed face, the bends defining the width of such face permitting strip manipulation to vary the angle of such face relative to the ledge plane.

12. In an upholstery spring construction, a rim strip having an inner longitudinal groove for receiving a marginal portion of the upholstery covering and an inner ledge below the groove for supporting a spring coil, the groove wall and ledge extending in opposite directions from a plane of the strip, the portions forming the groove being adapted to be bent to retain an inserted covering, and the other portion being bendable to retain an applied spring.

13. In an upholstery spring construction, a rim strip of sheet metal folded to form a longitudinal groove and a spring supporting ledge below the groove and on the same side of the strip, the groove wall and ledge extending in opposite directions from a plane of the strip, the portions forming the groove being adapted to be bent to retain an inserted covering margin and the other portions being adapted to be bent to retain a spring coil on the ledge.

14. In an upholstery spring construction, a rim strip of sheet metal having a hollow, longitudinal bead adjacent one margin that provides a longitudinal groove on the opposite face, a web extending from the bead toward the other margin and a marginal flange forming a ledge along the web extending oppositely to the bead, springs each having a turn resting on the ledge which is bent against each spring to retain it, and an upholstery covering having a thickened edge that extends between the springs and strip into the groove, the strip being clenched on to the inserted portion of the covering to secure the latter in the groove.

In testimony whereof we affix our signatures in presence of two witnesses.

WILLIAM D. McCULLOUGH.
THOMAS MAHONEY.

Witnesses:
ANNA M. DORR,
C. E. STICKNEY.